(12) United States Patent
Wang et al.

(10) Patent No.: US 11,709,774 B2
(45) Date of Patent: Jul. 25, 2023

(54) DATA CONSISTENCY AND DURABILITY OVER DISTRIBUTED PERSISTENT MEMORY SYSTEMS

(71) Applicant: Intel Corporation, Santa Clara, CA (US)

(72) Inventors: Ren Wang, Portland, OR (US); Yifan Yuan, Champaign, IL (US); Yipeng Wang, Portland, OR (US); Tsung-Yuan C. Tai, Portland, OR (US); Tony Hurson, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 163 days.

(21) Appl. No.: 16/986,094

(22) Filed: Aug. 5, 2020

(65) Prior Publication Data

US 2020/0371914 A1 Nov. 26, 2020

Related U.S. Application Data

(60) Provisional application No. 62/884,095, filed on Aug. 7, 2019.

(51) Int. Cl.
*G06F 13/16* (2006.01)
*G06F 12/0804* (2016.01)
(Continued)

(52) U.S. Cl.
CPC ...... *G06F 12/0804* (2013.01); *G06F 13/1668* (2013.01); *G06F 16/2365* (2019.01)

(58) Field of Classification Search
CPC ............. G06F 12/0804; G06F 16/2365; G06F 13/1668
(Continued)

(56) References Cited

U.S. PATENT DOCUMENTS 10,599,548 B2 3/2020 Wang et al.
2015/0224312 A1* 8/2015 Platz .................. A61N 1/37217
607/57
(Continued)

OTHER PUBLICATIONS

Ayoub, Ali, "RDMA over Converged Ethernet (RoCE)", Workshop on Data Center Converged and Virtual Ethernet Switching (DC CAVES), Mellanox Technologies, 2011, 21 pages.
(Continued)

*Primary Examiner* — Christopher B Shin
(74) *Attorney, Agent, or Firm* — Compass IP Law PC

(57) ABSTRACT

Examples described herein relates to a network interface apparatus that includes packet processing circuitry and a bus interface. In some examples, the packet processing circuitry to: process a received packet that includes data, a request to perform a write operation to write the data to a cache, and an indicator that the data is to be durable and based at least on the received packet including the request and the indicator, cause the data to be written to the cache and non-volatile memory. In some examples, the packet processing circuitry is to issue a command to an input output (IO) controller to cause the IO controller to write the data to the cache and the non-volatile memory. In some examples, the cache comprises one or more of: a level-0 (L0), level-1 (L1), level-2 (L2), or last level cache (LLC) and the non-volatile memory comprises one or more of: volatile memory that is part of an Asynchronous DRAM Refresh (ADR) domain, persistent memory, battery-backed memory, or memory device whose state is determinate even if power is interrupted to the memory device. In some examples, based on receipt of a second received packet that includes a request to persist data, the packet processing circuitry is to request that data stored in a memory buffer be copied to the non-volatile memory.

23 Claims, 8 Drawing Sheets

(51) Int. Cl.
*G06F 16/23* (2019.01)
*G06F 12/08* (2016.01)

(58) Field of Classification Search
USPC .......................................................... 711/103
See application file for complete search history.

(56) References Cited

U.S. PATENT DOCUMENTS

| | | | | |
|---|---|---|---|---|
| 2016/0127494 | A1* | 5/2016 | Liu | G06F 3/0656 709/212 |
| 2017/0255559 | A1* | 9/2017 | Burstein | G06F 15/17331 |
| 2017/0351613 | A1* | 12/2017 | Anderson | G06F 12/0868 |
| 2018/0137075 | A1* | 5/2018 | Linderman | G06F 13/4022 |
| 2018/0307650 | A1* | 10/2018 | Kachare | G06F 15/17331 |
| 2019/0087096 | A1* | 3/2019 | Ramanujan | G06F 12/0868 |
| 2019/0272236 | A1* | 9/2019 | Li | G06F 12/0891 |

OTHER PUBLICATIONS

Deming, David A., "infinBand Architecture Overview", Solution Technology, Storage Developer Conference, Santa Clara, 2013, 70 pages.
Douglas, Chet, "RDMA with PMEM software mechanisms for enabling access to remote persistent memory", Intel Corporation, Storage Developer Conference, Santa Clara , 2015, 14 pages.
Hilland, Jeff, et al., "RDMA Protocol Verbs Specification (Version 1.0)", draft-hilland-iwarp-verbs-v1.0, Apr. 2003, 243 pages.
Intel, "Intel® Data Direct I/O (Intel® DDIO): Frequently Asked Questions", Revision 1.0, Mar. 2012, 5 pages.
Pfister, Gregory, F., "An Introduction to the InfiniBand™ Architecture", Chapter 42, IBM Enterprise Server Group, Server Technology and Architecture, Nov. 23, 2000, 16 pages.
"CLFLUSH Flush Cache Line", x86 Instruction Set Reference, https://c9x.me/x86/html/file_module_x86_id_30.html, downloaded from the internet Dec. 15, 2022, 1 page.
"CLFLUSHOPT—Flush Cache Line Optimized", https://hjlebbink.github.io/x86doc/html/CLFLUSHOPT.html, downloaded from the internet Dec. 15, 2022, 3 pages.
SNIA Solid State Storage Initiative, "NVDIMM Messaging and FAQ", Contributor: AgigA Tech, Jan. 2014, 10 pages.

* cited by examiner

DATA CONSISTENCY AND DURABILITY OVER DISTRIBUTED PERSISTENT MEMORY SYSTEMS

RELATED APPLICATION

This application claims the benefit of priority of U.S. Provisional application 62/884,095, filed Aug. 7, 2019. The contents of that application is incorporated in its entirety herein.

DESCRIPTION

Distributed systems in large data centers are critical for large-scale online services, such as distributed storage systems, distributed publisher-subscriber services and distributed web services. Such services usually perform certain persistent and consistent data distribution across multiple nodes (e.g., multiple replicas for storage systems or publishers), to ensure high data availability and performance. Data durability is a concern so that, in the event of power loss, stored data is not lost. Non-volatile memory (NVM) storage can be used to store and retain data even if power is lost. Persistent memory (PMEM) is a memory technology that provides much faster access to data than NVM storage. Coupled with a remote direct memory access (RDMA) enabled NIC (RNIC) (or other high speed fabric), PMEM can potentially improve efficiency of data distribution for large distributed systems and significantly reduce access latency overhead associated with traditional storage devices.

DETAILED DESCRIPTION

Remote direct memory access (RDMA) write and read operations can provide a direct memory access from the memory of one computer into a memory of another computer without involving either computer's operating system. RDMA write or read operations can take place using RDMA-enabled NICs at a sender and receiver. Some RDMA operations do not take into consideration of characteristics of persistent memory (PMEM). For example, the behavior of a cache, dynamic random access memory (DRAM), or PMEM is separated from and not visible (e.g., data is not accessible by a core) or controlled using network packets or network interface controllers.

Data Direct I/O (DDIO) is an I/O protocol that enables a sender device (e.g., network interface card (NIC) or computing platform) to send data to a receiver NIC for copying into a cache level such as the last level cache (LLC) without having to first copy the data to main memory and then to LLC. DDIO enables a processor cache, rather than a system's main memory, to be a source or destination of data. Using DDIO, a receiver NIC can store received data into the cache, which is outside of an Asynchronous DRAM Refresh (ADR) domain. Data stored in the ADR domain can be a designated area of memory that is persisted when there is a crash or power loss and restored on system restart. For example, when DDIO is enabled on a receiving platform for performance or energy-use optimizations, there is uncertainty of when content copied by an RDMA write into cache (e.g., LLC) becomes persistent or durable (e.g., written into non-volatile memory or battery-backed volatile memory).

Figure 1:
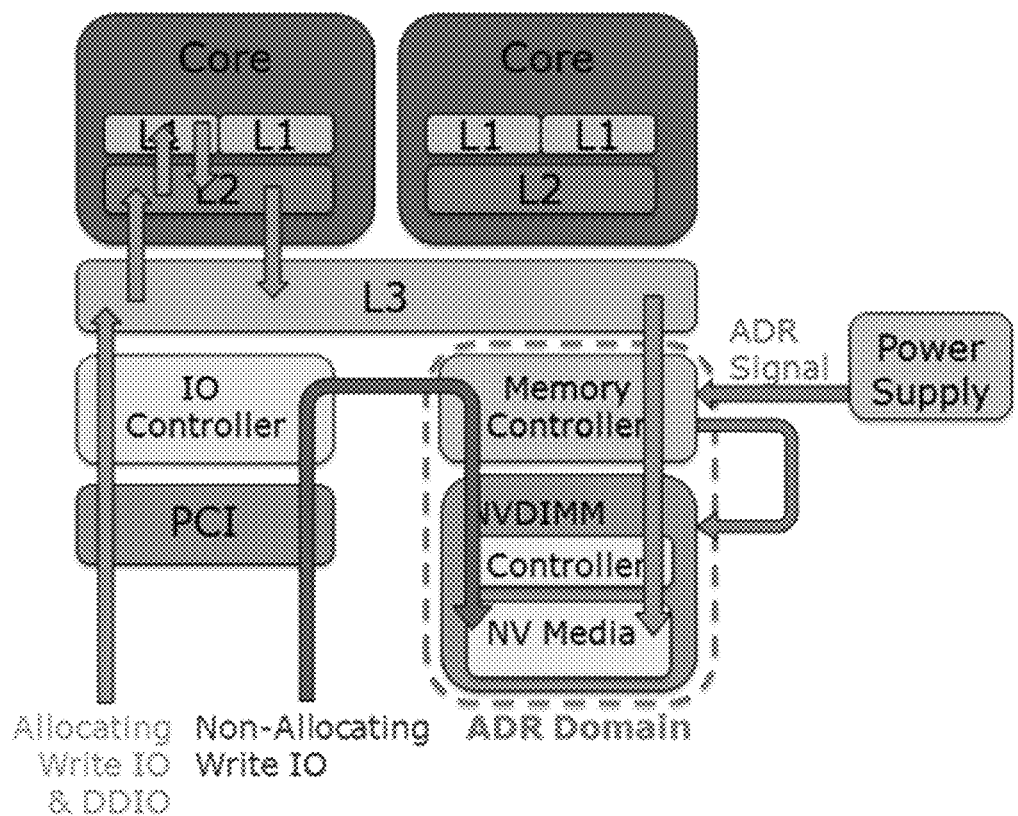
FIG. 1 depicts an example of RDMA with persistent memory background handling.

FIG. 1 depicts an example of RDMA with persistent memory background handling. As shown in FIG. 1, input output (IO) controller (IIO) can control IO flow between devices and central processing unit (CPU) complex and memory. Peripheral component interconnect express (PCIe) is used here as an example, but the device could be on a fabric as well or use other connection standards. When DDIO is enabled, the incoming packets from an RDMA-capable device (e.g., network interface) are written into last level cache (LLC) (also called L3) directly, instead of into memory. When there is an IO read, data can be read from LLC as well, if the line is found in the cache.

When data resides in LLC, it is accessible to all local CPU cores and remote nodes through RDMA and DDIO, however there is no guarantee whether those cache lines are durable or persisted and if power loss occurs, the data may not be stored into non-volatile memory and can be lost. As shown in FIG. 1, ADR can be used to ensure that data stored in an ADR region (e.g., including dynamic random access memory (DRAM) and a memory controller cache) is copied into persistent memory (PMEM) prior to or upon a power loss to volatile memory. Hence, for a configuration with DDIO enabled, the sender of RDMA writes is not informed of when data become durable or persisted. For distributed systems where the cross node consistency is required, extra measures need to be taken to maintain cross node data consistency so that data stored in multiple computing nodes is the same.

An example solution to achieve cross node PMEM consistency includes (1) disabling DDIO, so that all incoming RDMA writes are copied by direct memory access (DMA) into an ADR domain of memory and hence becomes durable (e.g., an ADR domain in DRAM) and (2) at a software durability point, when a sender-side software is to make previously sent data durable, the sender can issue an RDMA read, to make sure all previous writes are cleared out of IIO buffers and copied into non-volatile memory or an ADR region. The RDMA read can cause a flush of PCIe and memory controller pipelines into the non-volatile memory or an ADR region. However, disabling DDIO may cause significant performance and energy-use impact as all received data are copy by DMA into memory instead of into cache where CPU can access the data directly. Data copy operations are incurred to copy data from memory into the cache. Besides the latency to persisting data from issuing an additional RDMA read, disabling DDIO may cause performance degradation for applications that could have accessed the data from the cache.

Another example solution to achieve cross node data consistency includes permitting DDIO to be enabled and achieving data durability for data in volatile memory using a receiver side software to handle interruptions and push (copy) all or a subset of content of cache lines to memory. An initiating node first performs an RDMA with DDIO enabled to write to cache. At a durability point, the sender sends an RDMA message to inform the receiver of the cache lines to be made durable. Upon receiving this message, the receiver issues an interrupt to software and the software issues CLFLUSH or CLFLUSHOPT to each cache line in the list of identified cache lines to push (copy) data into memory, followed by a memory fence to make sure all copied data are in the ADR domain and will be persisted. However, this approach involves a server side call back, which introduces additional latency in flushing or persisting data.

Significant latency can result due to RDMA send with cache lines subject to a CLFLUSH or CLFLUSHOPT operation. For example, if an RDMA write causes 4-8 KB of data to be stored into cache and a cache line is 64 bytes in size, then copying data from the cache on a line by line basis can be time consuming and block devices from cache use. The software-based methods can result in low performance, high overhead and long latency before persistence of data.

In some embodiments, the written-to LLC could be included in the ADR domain, so that all data into LLC are also durable. However, the power and area cost of including LLC in the ADR domain can be prohibitively high.

Various embodiments provide technologies to support data consistency over distributed PMEM systems. Various embodiments provide technologies to achieve high performance and consistent RDMA access to remote persistent memory devices. Various embodiments provide architectural and networking support for data consistency or durability over distributed PMEM systems, by enabling a system (e.g., remote system) to indicate the desired behavior for memory transactions through networking and a network interface card or network interface controller, and cause receiver hardware or software to take appropriate actions to achieve data durability.

In some examples, a sender can issue a remote direct copy operation (e.g., RDMA) to cause data from a cache, memory, or storage device to be copied by transmission of a packet or other communication to a receiver device. The sender can cause the receiver to write the data into cache and also into a memory whose content is persisted even if power is interrupted to the memory (e.g., persistent memory or non-volatile memory). In some cases, the receiver may copy the data into a memory buffer before copying the data from the memory buffer into the memory. For example, a bus or connection between an IO controller and the memory can be congested and the memory buffer can be used to temporarily store the data before the data can be written to the memory. The sender can transmit another packet or communication to the receiver device to cause the receiver to copy the data from the memory buffer to a persistent memory or non-volatile memory. In some examples, the data may have been already been copied or is in the process of being copied to persistent memory or non-volatile memory at receipt of the communication to cause the receiver to copy the data from the memory buffer to a persistent memory or non-volatile memory. In some examples, the data has not been copied from the memory buffer to a persistent memory or non-volatile memory and the communication to cause or request the receiver to copy the data from the memory buffer to a persistent memory or non-volatile memory can cause a copying of the data to the memory. In some examples, the sender can cause the receiver to designate the memory buffer, memory or at least an addressable region of the memory buffer or memory in which the data is stored to be subject to ADR.

Issuance of the packet or communication to the receiver device to cause the receiver to copy the data from the memory buffer to a persistent memory or non-volatile memory can potentially avoid copying of content from cache to persistent or non-volatile memory. For example, a cache line size can be 64 bytes and copying cache lines to the persistent or non-volatile memory can involve numerous cache line copies. Copying data from a memory buffer to persistent or non-volatile memory can avoid copying from the cache and can free the cache for other uses than a source of a data copy and can be faster than copying from the cache. In addition, the data copied from the memory buffer to persistent or non-volatile memory can be made persisted and available for access from persistent or non-volatile memory sooner than were the data to be copied from cache to persistent or non-volatile memory. As a result, time critical applications can access the data from the persistent or non-volatile memory sooner and data consistency can be achieved sooner. In addition, in an event of power loss, power failure, insufficient power, restart or waking from sleep state, data will not be lost as the data in volatile memory is persisted to persistent or durable memory.

Figure 2:
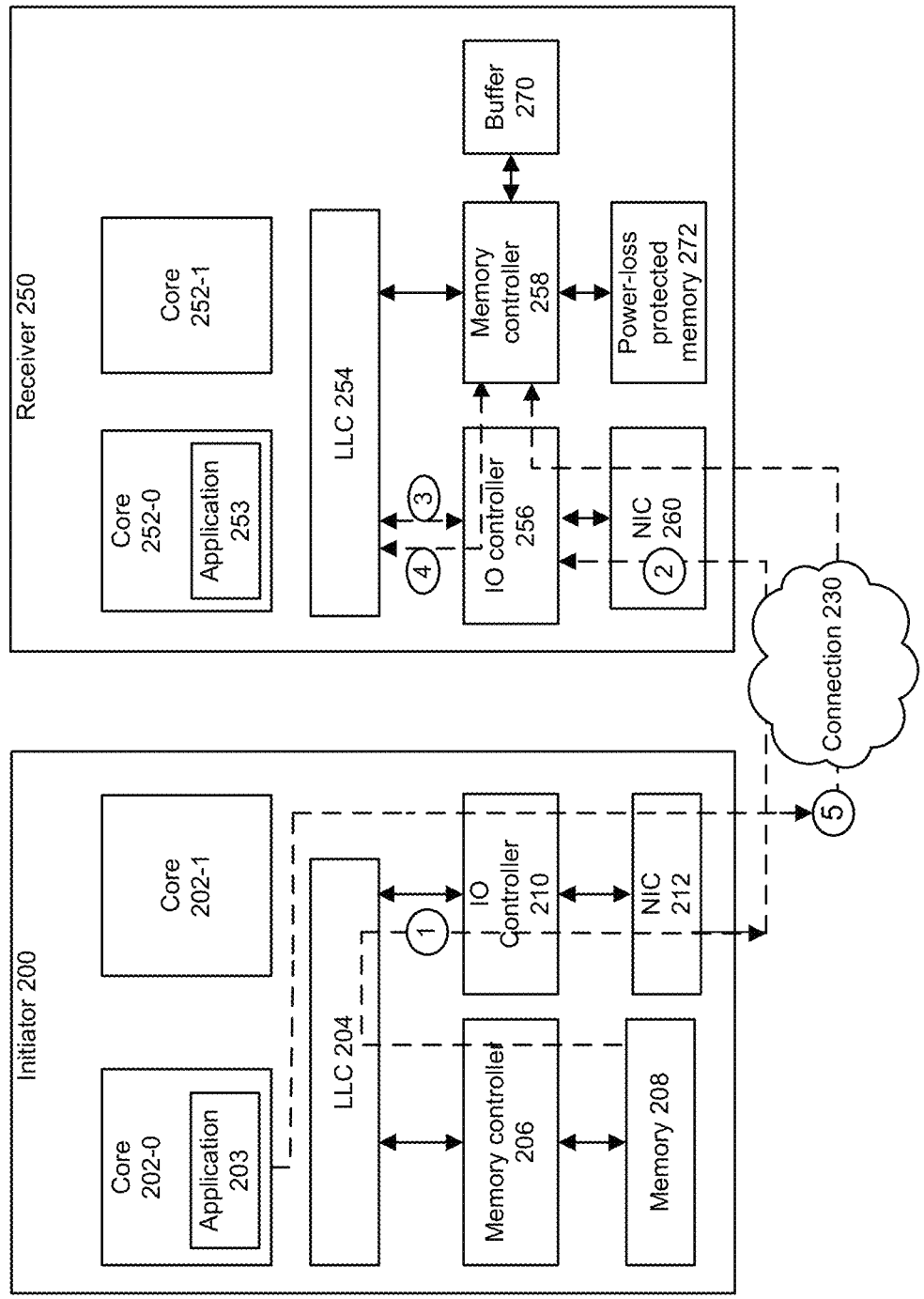
FIG. 2 illustrates a system and sequence of operations.

FIG. 2 illustrates a system and sequence of operations in accordance with some embodiments. Some embodiments can provide efficient data consistency in persistent memory of multiple nodes. Initiator 200 can include cores 202-0 and 202-1. Although two cores are shown, more than two cores or fewer than two cores can be used. A core can be an execution core or computational engine that is capable of executing instructions. A core can have access to its own cache and read only memory (ROM), or multiple cores can share a cache or ROM. Cores can be homogeneous and/or heterogeneous devices. Any type of inter-processor communication techniques can be used, such as but not limited to messaging, inter-processor interrupts (IPI), inter-processor communications, and so forth. Cores can be connected in any type of manner, such as but not limited to, bus, ring, or mesh.

Initiator 200 can include an uncore or system agent can include or more of a memory controller, a shared cache (e.g., LLC 204), a cache coherency manager, arithmetic logic units, floating point units, core or processor interconnects, or bus or link controllers. System agent can provide one or more of: direct memory access (DMA) engine connection, non-cached coherent master connection, data cache coherency between cores and arbitrates cache requests, or Advanced Microcontroller Bus Architecture (AMBA) capabilities.

Application 203 can execute on one or more of cores 202-0 to 202-1. Non-limiting examples of application 203 can include a database that manages records, files, data, video, images, web pages, and any content stored in memory 208 and other memory or storage devices on other computing platforms. Herein, "data" can refer to any type of content stored in memory 208. Examples of databases include relational databases, Structured Query Language (SQL) databases, NoSQL databases, and so forth. Any type of database can be used such as Redis, MongoDB, Memcached, and so forth. Application 203 can cause data stored in memory 208 to be copied to other devices by issuing a request to copy data by transmission of the data using one or more packets. Some embodiments of application 203 can request that one or more packets that transmit the data to the receiver include an indicator or request that the receiver is to store the data in cache (e.g., as a DDIO operation) and in a persistent memory (e.g., power-loss protected memory 272). In some cases, such as due to congestion at an input to power-loss protected memory 272, received data is stored in memory buffer 270 and not in power-loss protected memory 272. Some embodiments of application 203 can also indicate in any packet to copy the data from memory buffer 270 to a region of memory that will not be erased in the event of power loss to the region of memory (e.g., power-loss protected memory 272).

For example, application 203 can request transmission of a packet, to be transmitted after the one or more packets that carry the data, to include a request or indicator for the receiver to copy the data from the memory buffer to the region of memory that will not be erased in the event of power loss to the region of memory. For example, at an administrator configured amount of time after a request to transmit the data to the receiver, application 203 can request transmission of the packet that includes an indicator to copy the data from the memory buffer to the region of memory that will not be erased in the event of power loss to the region of memory.

For example, message RDMA_write with a data_durability flag can be used for communicating which data is to be stored in a cache (e.g., LLC 254) and a memory (e.g., power-loss protected memory 272). In response to receiving an RDMA_write with data_durability flag set to YES, receiver NIC 260 can issue a write transaction to instruct IO controller 256 to write the received data to a cache (e.g., LLC 254 or other cache layer) and a memory (e.g., power-loss protected memory 272) simultaneously, or starting at different overlapping or non-overlapping times. In some examples, a region of power-loss protected memory 272 to which the data is written can be identified as ADR or subject to a copying of content of the region to non-volatile memory if the memory buffer loses power or some other triggering event.

For example, message RDMA_write with data_durability flag can indicate cache line identifiers for which data stored in the cache lines corresponding to the cache line identifiers are to be persisted or made durable. Message RDMA_read with data_sync flag can be used to signal a durability point or a trigger of when data temporarily stored in memory buffer (e.g., buffer 270) is to be copied to persistent or non-volatile memory (e.g., power-loss protected memory 272). Message RDMA_read with data_sync flag can include one or more cache line identifiers (e.g., start cache line, end cache line) to indicate content of which cache lines stored in buffer 270 are to be copied to or persisted to power-loss protected memory 272. In some examples, message RDMA_read with data_sync flag can indicate to receiver NIC 260 that any content of buffer 270 are to be copied to or persisted to power-loss protected memory 272. Upon receiving this message, receiver NIC 260 can instruct IO controller 256 to flush or copy all or some data corresponding to cache lines associated with the data stored in buffer 270 into power-loss protected memory 272 and reply with completion signaling. An RDMA_read can be used to identify memory addresses but not data to be read and causes data to be synched into memory and communicating completion to the sender.

In some examples, data in buffer 270 may have been already copied or in the process of being copied to power-loss protected memory 272 at receipt of the communication to cause the receiver to copy the data from memory buffer 270 to power-loss protected memory 272. In some examples, the data has not been copied from memory buffer 270 to power-loss protected memory 272 and the communication to cause the receiver to copy the data from the memory buffer to a persistent memory or non-volatile memory can cause or request a copying of the data from buffer 270 to power-loss protected memory 272.

In some examples, an Ethernet packet can include a request or indicator that the receiver is to cause storage of the data in a cache and in memory that will not be erased in the event of power loss and the request or indicator can be a one or multiple bit value in an optional field of an Ethernet header (e.g., 802.1Q tag). In some examples, an Ethernet packet can includes a request or indicator for the receiver to copy the data from the memory buffer to the region of memory that will not be erased in the event of power loss and the request or indicator can be a one or multiple bit value in an optional field of an Ethernet header (e.g., 802.1Q tag).

In some examples, an InfiniBand compatible packet can include a Base Transport Header (BTH) and any of fields resv6 and resv7 can be used to convey a request or indicator that the receiver is to cause storage of the data in a cache and in memory that will not be erased in the event of power loss. In some examples, an InfiniBand compatible packet can include a BTH and any of fields resv6 and resv7 can be used to convey a request or indicator for the receiver to copy the data from the memory buffer to the region of memory that will not be erased in the event of power loss. Other protocols can be used such as RoCE, RoCEv2 (e.g., described at least in Annex A17: RoCEv2 (2014)), InfiniBand or iWARP to transmit the any of the requests or indicators or data.

Description next turns to an example operation. For example, at action (1), application 203 executed in initiator 200 can issue an RDMA write command using any protocol (e.g., Ethernet, RoCE, RoCEv2, iWARP, InfiniBand, and so forth) and/or request a DDIO operation to copy data from LLC 204 or memory 208 and write the data to remote LLC 254 and memory 272 of receiver 250. For example, application 203 or any hardware or software device in initiator 200 can request a DDIO or other write-to-cache operation to be issued with a data write request in a packet sent from a network interface card (NIC) 212. For example, application 203 can cause or request transmission of a packet with the data as well as an indicator for NIC 260 to cause or request storage of the data into LLC 254 and memory 272 (or other volatile memory, battery-backed volatile memory, non-volatile memory, or persistent memory). Application 203 can cause or request NIC 212 to transmit such write command packet to NIC 260 used by receiver 250 over connection 230.

Connection 230 can be any network, fabric, bus, or interconnect. More than two devices can be connected together using connection 230. Connection 230 can be compatible at least with Intel® QuickPath Interconnect (QPI), Intel® Ultra Path Interconnect (UPI), Intel® On-Chip System Fabric (IOSF), Omnipath, Ethernet, InfiniB and, Compute Express Link (CXL), HyperTransport, high-speed fabric, PCIe, NVLink, Advanced Microcontroller Bus Architecture (AMBA) interconnect, OpenCAPI, Gen-Z, CCIX, NVMe, NVMe-oF, any network fabric that supports memory accesses using a memory transaction protocol, and so forth.

At (2), based on receipt of one or more packets that transmit the data and include an indicator or request that the receiver is to store the data in cache (e.g., LLC 254) and in a memory (e.g., memory 272), receiver NIC (NIC) 260 can set an appropriate hint in a PCIe write messages to an uncore (e.g., system agent) associated with core 252-0 or 252-1 that received data is to be durable. For example, receiver NIC 260 can issue TLP Processing Hints (TPH) PCIe compatible hints and Steering Tag (ST) bits in TPH can be system-specific values to indicate that IO controller 256 is to cause the received data to be written to LLC 254 and memory 272. IO controller 256 can provide an interface and controller for connected devices including PCIe connected devices to connect with and write to or read from LLC 254 and command memory controller 258 to read or write to one or more memory devices. For example, IO controller 256 can write to LLC 254 or cause memory controller 258 to write to LLC 254, memory 272. Commands using other interface specifications can be used such as but not limited to CXL or other specifications listed or not listed herein. Commands using other interface specifications can be used such as but not limited to CXL or other specifications listed or not listed herein.

In some examples, in response to receipt of the data_durability flag, indicator that data is to be persisted, or indicator to store the data into a cache and memory buffer, NIC 260 can cause IO controller 256 at (3) to write data associated with the received RDMA write to LLC 254, or other cache level or memory. A cache can be a volatile memory and closer to a processor core than an on-device memory. The cache can store copies of the data from frequently used main memory locations. A cache can include a level-1, level-2, lower or last level cache (LLC), among others. A cache can be used by a central processing unit (CPU) or core to reduce time or energy used to access data from the main memory.

In some examples, in response to receipt of the data_durability flag, indicator that data is to be persisted, or indicator to store the data into a cache and memory, at (3), NIC 260 can copy the received data using direct memory access (DMA) to LLC 254 via IO controller 256 or issue a PCIe write command for IO controller 256 to copy the received data into LLC 254. In some examples, RNIC 260 can configure a portion of the ST bits to indicate to an integrated input output (IO) (IIO) device that data writes of data received with the data_durability flag are to be made persistent in memory (e.g., stored in non-volatile memory). In some examples, an IIO device can be an integrated input output (IO) device (or non-integrated IO device) in IO controller 256. IO controller 256 can provide communications capability at least between NIC 260, LLC 254, memory controller 258, and a CPU system. For example, a CPU system can include cores 252-0 and 252-1. Although two cores are shown, more than two cores can be included. A CPU system can include an uncore or system agent.

Based on receipt of a durability flag with one or more packets by NIC 260 or receipt of a PCIe message with a TPH hint set, IO controller 256 can: at (3), allocate received data for storage into LLC 254 (or other cache such as level-0 (L0), level-1 (L1), or level-2 (L2)) and at (4), issue a Cache Line Write Back (CLWB) flow to write the received data associated with a cache line of LLC 254 to memory 272 (e.g., volatile or non-volatile memory) to back-up the received data. In some examples, data written to LLC 254 can be separately written to memory 272 so that data is written to LLC 254 and memory 272 instead of copying data from LLC 254 to memory 272. In some examples, action (4) can include IO controller 256 performing CLWB on data stored in LLC 254 to copy data stored in LLC 254 to memory 272.

However, where a connection with memory 272 is congested or input to memory 272 is congested, data can be copied to buffer 270 (e.g., SRAM) before storage into memory 272. IO controller 256 can attempt to copy data from buffer 270 to memory 272 when the connection is not congested at a later time. In some examples, a region of buffer 270 in which the data is stored using a CLWB can be considered within an ADR domain. When data is in system memory within an ADR domain, the data becomes durable or is considered durable.

The CLWB operation may not be in a critical path and a packet receipt acknowledgement can be sent to initiator 200 when or after the received data is stored in LLC 254 and visible to the receiver system 250 (e.g., stored in LLC and accessible to a core). The CLWB operation can be overlapped with data communication, and may not introduce extra latency to when data is visible or accessible from LLC by an application (e.g., application 253).

However, since CLWB (or CLFLUSHopt) can be weakly ordered uncore (system agent) flows, the order and specific time of the cache lines copied from buffer 270 into durable memory (e.g., ADR domain, memory 272, or other persistent or non-volatile memory) is not guaranteed. In some examples, signaling the software durability point can be used to trigger a fence operation to cause a flush of content of memory buffer 270 into durable memory 272. Initiator 200 can identify that data in LLC 254 is not directly written to DRAM or persisted but to memory buffer 270 before being written to durable memory 272 (e.g., volatile memory in an ADR domain, non-volatile memory or persistent memory). An RDMA initiator such as application 203 can tag a write command or issue a command to cause content of the cache lines in buffer 270 to be persisted in memory 272.

Action (5) can include initiator 200 sending an RDMA synch command (e.g., RDMA_read with data synch flag) to receiver 250 to cause flushing content of the PCIe and memory control pipeline and buffer 270 to power-loss protected memory 272 to make sure all the data subject to the synch command are made persistent. For example, at a point of data synchronization, application 203 can cause NIC 212 to transmit a packet that includes a request for receiver NIC 260 to cause data stored in buffer 270 to be copied to power-loss protected memory 272.

In some examples, at action (5), NIC 260 receives an RDMA_sync from NIC 212 that indicates a range of memory addresses or cache lines to be persisted and cause IO controller 256 to cause memory controller 258 to copy data corresponding to the range of memory addresses or cache lines to power-loss protected memory 272. For example, in some embodiments of action (5), NIC 260 can receive RDMA_read with data_sync flag and send a TPH durability point to IO controller 256 to cause a data flush of buffer 270 to guarantee durability of the data in buffer 270.

Upon receiving the RDMA durability point (e.g., RDMA_read with data_sync flag), NIC 260 can initiate a PCIe read with appropriate TPH hints (e.g., durability point) set. This hint can trigger IO controller 256 to perform a memory fence to flush or copy some or all data in a buffer 270 (e.g., IIO buffer) into durable memory (e.g., memory 272) in order to guarantee data durability of the data stored in the buffer with a durability flag. An uncore (system agent) can write back those lines to memory 272 immediately upon receiving the durability point, while also leaving a copy in LLC 254 for high performance CPU processing. During a software durability point, receiver 250 only needs to flush a portion or all of its buffer 270 to make sure data from a prior write operation by initiator 200 are made durable. The latency incurred is relatively small compared to software interrupt handling and flushing multiple cache lines line-by-line using for example, Intel® CLPLUSHopt. Note that in some cases, when RDMA_read with data_sync flag is received, IO controller 256 may be performing or has completed copying of the data subject to the RDMA_read with data_sync flag to memory 272.

NIC 260 can send a completion signal of RDMA_sync completion to initiator client 200. For example, IO controller 256 can issue an acknowledgement that is sent through NIC 260 to NIC 212 to inform application 203 that data with a durability guarantee has been stored to persistent memory (e.g., memory 272) at receiver 250. Upon receiving the acknowledgement for the RDMA synch, the RDMA initiator can move the check point forward.

In some embodiments, IO controller 256 can cause the completion or acknowledgement signal to be sent to initiator client 200 but not cause a flush of data subject to a durability flag from memory buffer 270 to memory 272. Instead, IO controller 256 can mark data in memory buffer 270 so that ADR is applied to the data in memory buffer 270 to provide a temporary guarantee that data in memory buffer 270 will be persisted to non-volatile memory or battery backed-up memory in an event of a power loess to memory buffer.

In some examples, initiator 200 can initiate a flush, copy, eviction, or demotion of contents of LLC 254 or other cache (e.g., L0, L1, L2) in receiver 250 to a lower level cache (e.g., from a cache level closest to the core to a cache level that is further from the core). In some examples, initiator 200 can initiate a flush, copy, eviction, or demotion of contents of LLC 254 or other cache (e.g., L0, L1, L2) in receiver 250 to memory buffer 270 or power-loss protected memory 272. For example, initiator 200 can issue a command to receiver 250 to cause receiver 250 to perform a CLDEMOTE operation to demote or evict contents of LLC 254 or other cache (e.g., L0, L1, L2) in receiver 250 to a lower level cache, memory buffer 270, or power-loss protected memory 272. Subsequently, receiver 250 can persist the content of a cache subject to a CLDEMOTE operation to persistent memory or protect the content using ADR. For example, at a request from initiator 200, receiver 250 can persist the content of a cache subject to a CLDEMOTE operation to persistent memory.

Various software distributed persistent systems can be implemented leveraging the underlying networking enabled PMEM hardware assisted approach. A software protocol (e.g., for distributed PMEM file systems or PMEM as dual in-line memory module (DIMM)) can leverage at least some of the embodiments.

Embodiments are described in the context of RDMA, but approaches can be applied to Ethernet (IEEE 802.3-2018 and any earlier or later versions or variations thereof) or other protocols. RDMA is described at least in RFC 5040 (2007) and RFC 7306 (2014) and variations and derivatives thereof. Various versions of RDMA can be used including but not limited to RDMA over Converged Ethernet (RoCE), InfiniBand, Omni-Path, and iWARP. Although an example is provided showing one sender to one receiver, a sender could send data write requests to two or more receivers. Various embodiments can use an RDMA protocol or networking protocol(s) from InfiniBand Trade Association (IBTA) and the Internet Engineering Task Force (IETF) to indicate which messages or data are to be stored in cache and persistent memory or non-volatile memory. In some examples, standards or specifications from InfiniB and Trade Association (IBTA) or the Internet Engineering Task Force (IETF) can cause caching of content in volatile memory to durable memory.

According to some embodiments, an operating system, virtual machine, container, application, or driver executed on initiator 200 or receiver 250 can enable (turn on) or disable (turn off) a feature that permits initiator 200 to request copying of content destined for a cache also to a memory buffer or to request persisting of content in a memory buffer, or any other feature described herein.

Figure 3:
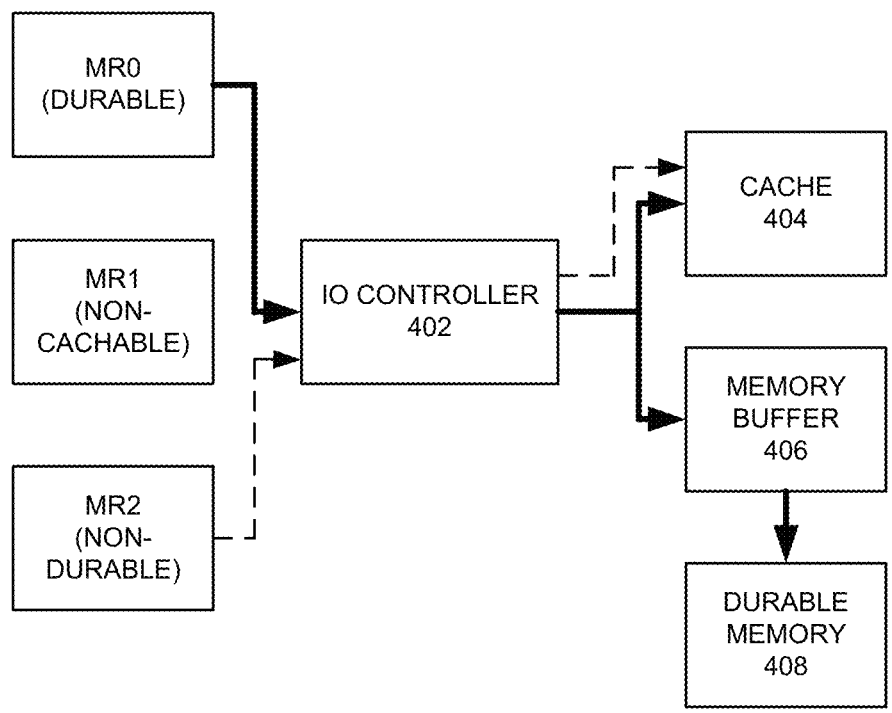
FIG. 3 depicts an example memory configuration.

FIG. 3 depicts an example memory configuration. For example, some target systems (e.g., a burst buffer) do not perform processing on received data and act as a forwarding element to transfer data or packets to another device. In such cases, writing data from a received packet to cache could pollute the cache or be an unnecessary write of data to cache if a core does not process the data from the cache. A caching policy can be defined at the receiver to indicate whether received data is to be stored in cache (e.g., LLC) at the receiver. If data is not stored in the cache, when a synchronization operation occurs, the cache may not be read but a memory buffer can be read from to copy the data from the memory buffer.

In some examples, a target RDMA memory region (MR) in volatile memory can be assigned a cache and durability policy (e.g., non-cacheable, copy to durable memory, non-durable, write-through, write-allocate, and so forth) so that RDMA writes and reads targeting a given MR can have the applicable target cache policy applied. A hypervisor could program a receiver NIC to identify what regions are to be persisted based on cacheability or durability of an MR. Accordingly, in some examples, a write command need not include a data durability flag and a target memory address and its corresponding cache and durability policy can be used at the receiver to identify a cacheability and durability level of the data.

For example, at start up, a receiver system can allocate cache and durability policies for memory address regions (MRs) including RDMA queues. A receiver NIC can indicate the cache and durability policies for memory address regions to one or more initiator devices to configure the initiator devices to be able to specify cache and durability policies merely based on a target address. An initiator can send a durability point request after a request to write data into a target address.

For example, as shown in FIG. 3, addresses corresponding to memory region MR0 can be identified as durable, addresses corresponding to memory region MR1 can be identified as non-cacheable, and addresses corresponding to memory region MR2 can be identified as non-durable. A write request for data to addresses received in a packet by a NIC can specify an address and cause the NIC to issue a write command to IO controller 402. IO controller 402 can be configured to identify a cache and durability policy associated with a memory address. In a case of a write request to addresses corresponding to memory region MR0, IO controller can copy the data to cache 404 and memory buffer 406 (e.g., if a connection to durable memory 408 is congested) or durable memory 408 (e.g., when a connection to durable memory 408 is uncongested), and at a durability point, copy content from memory buffer 408 (e.g., if content has not already been copied to durable memory 408) to durable memory 408 (e.g., non-volatile memory, persistent memory, or battery backed-up memory). In a case of a write request to addresses corresponding to memory region MR1, IO controller identifies the address as corresponding to pass through data (e.g., data to be forwarded) that is not to be accessed by a core on the server and does not need to be cached even if the request is a DDIO request or request to write to cache. In a case of a write request to addresses corresponding to memory region MR2, IO controller identifies the address as corresponding to non-durable data and IO controller 402 stores the data into cache 404 but not memory buffer 406 or durable memory 408.

Figure 4A:
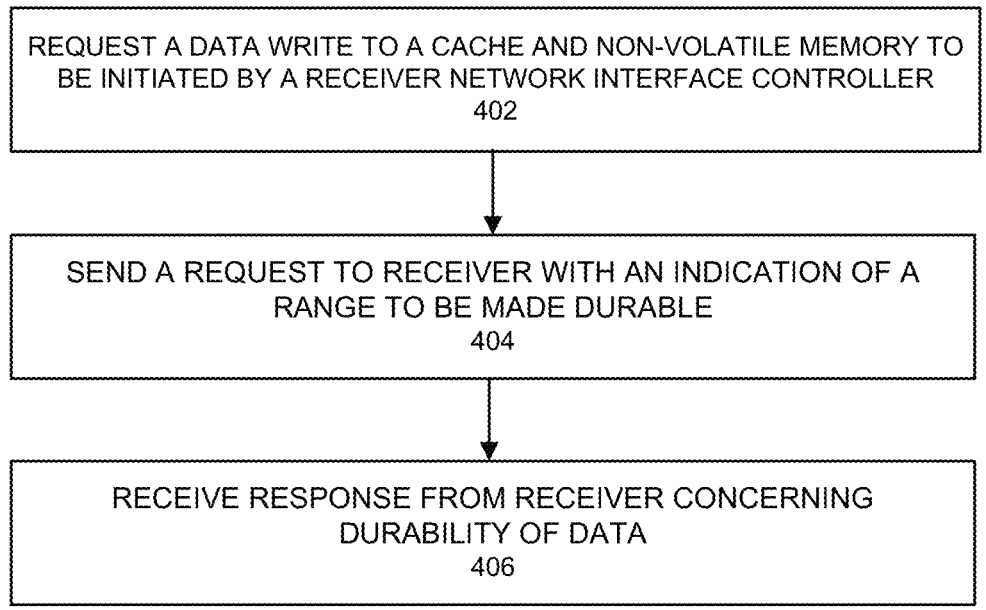
FIGS. 4A and 4B depict example processes.

FIG. 4A depicts a process that can be used by a sender device to cause durability or persistence of data stored at a target device. The process can be performed by an initiator or sender of data in connection with achieving consistency of distributed data. At 402, an initiator can request a data write to a cache and a non-volatile memory to be initiated by a receiver NIC at the target device. The initiator can be a database software or other application that is to cause storage of multiple copies of data in a distributed database for example. The request can include an indication of a durability request. In some examples, the request can be of a format described with respect to RDMA_write with data_durability flag. In some examples, the request can be made using RDMA Verbs (RDMA Protocol Verbs Specification (Version 1.0) (2003). The request can be transmitted using one or more packets compatible with any of: Ethernet, InfiniBand, RoCE, RoCEv2, iWARP, or other protocol to a receiver NIC used by the target device.

At 404, the initiator can send a request to a receiver with an indication of an address range to be made durable. For example, a message RDMA_sync or RDMA_read with data synch flag can be sent by the initiator to indicate a range to be persisted. The range can include a range of memory addresses or identification of cache lines. The initiator client can cause the receiver to flush (copy) content of the memory buffer to persistent or non-volatile memory and send completion signal to the initiator. In some cases, if the content has been copied from the memory buffer to the non-volatile memory, the receiver does not repeat the copy operation. At 406, the initiator can receive a response from a receiver concerning durability of data. For example the response can indicate the data has been stored to persistent or non-volatile memory at the receiver.

Figure 4B:
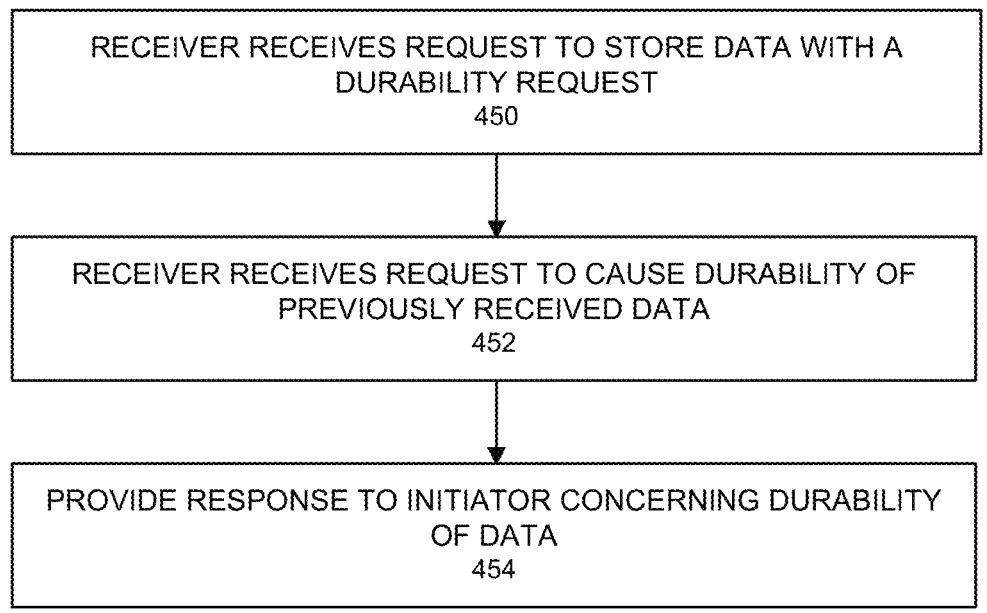

FIG. 4B depicts a process. The process can be performed by a receiver system (e.g., NIC connected to a server or datacenter) that receives data from an initiator in connection with a distribution of data and attempt to achieve data durability and consistency across multiple nodes. At 450, the receiver processes a received request with a durability request. The received request can identify one or more one or more cache lines that are to be written-to. In some examples, the received request includes an identification of a destination address in memory and the address corresponds to a cache and durability policy such that the data is to be stored in cache and memory. The NIC can cause data to be written to cache (e.g., LLC), or other cache level or memory. In some examples, the request can cause allocation of the data into the cache and issuing a Cache Line Write Back (CLWB) to simultaneously write content of the cache line data to a non-volatile memory. In some examples, data is written into the cache and copied from the cache to a temporary buffer or the non-volatile memory. In some examples, data is written into the cache and also written to the temporary buffer or the non-volatile memory, but the data is not copied from the cache into the temporary buffer or non-volatile memory but copied from the receiver NIC to the temporary buffer or non-volatile memory. In some examples, data is written into the temporary buffer before the data is written to the non-volatile memory if a connection with the non-volatile memory is congested.

At 452, the receiver system receives a request to perform a durability operation. The request can be received from an initiator device that previously sent a request to store data in both a cache and non-volatile memory. The request to perform a durability operation can identify one or more cache lines and the receiver can copy data from the temporary memory buffer to a persistent or non-volatile memory. In some examples, the receiver system receives a request to perform a durability operation by receipt of an address or address range that corresponds to a memory region that has a cache and durability policy such that data stored at that address or address range is to be stored in durable memory (e.g., memory that does not lose its content after power loss or reduction of power to the durable memory) after receipt of a durability operation. In some examples, the memory that stores the data subject to a durability operation is a volatile memory protected against loss of data due to power loss using an ADR. At 454, the receiver sends a reply to the initiator that data has been stored with a durability guarantee.

Figure 5:
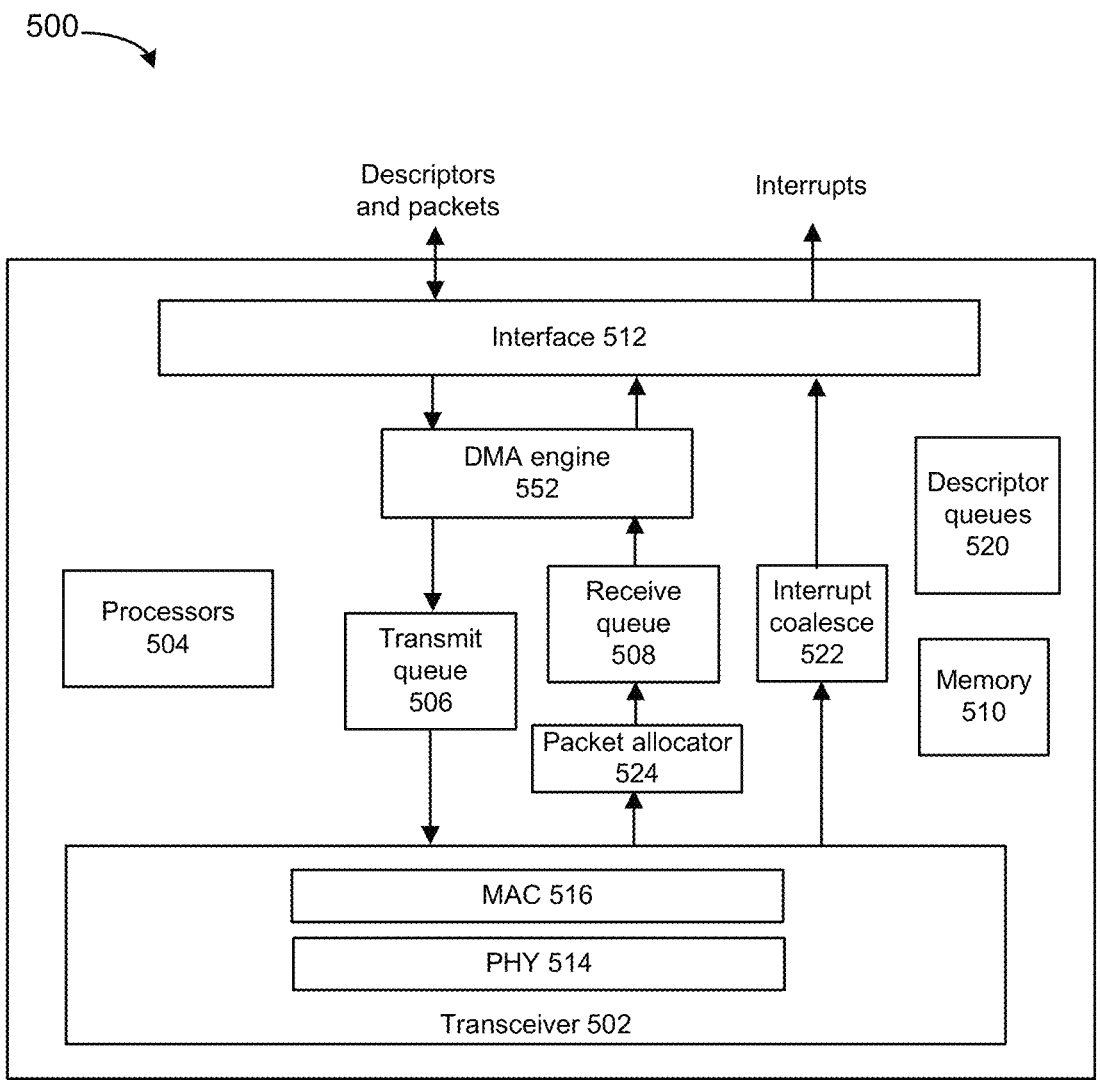
FIG. 5 depicts an example network interface.

FIG. 5 depicts an example network interface. In some embodiments, network interface can be used to send or receive write commands with durability requests or durability operations and other embodiments described herein. In some examples, network interface 500 can be implemented as a network interface controller, network interface card, a host fabric interface (HFI), or host bus adapter (HBA), and such examples can be interchangeable. Network interface 500 can be coupled to one or more servers using a bus, PCIe, CXL, or DDR. Network interface 500 may be embodied as part of a system-on-a-chip (SoC) that includes one or more processors, or included on a multichip package that also contains one or more processors.

Network interface 500 can include transceiver 502, processors 504, transmit queue 506, receive queue 508, memory 510, and bus interface 512, and DMA engine 552. Transceiver 502 can be capable of receiving and transmitting packets in conformance with the applicable protocols such as Ethernet as described in IEEE 802.3, although other protocols may be used. Transceiver 502 can receive and transmit packets from and to a network via a network medium (not depicted). Transceiver 502 can include PHY circuitry 514 and media access control (MAC) circuitry 516. PHY circuitry 514 can include encoding and decoding circuitry (not shown) to encode and decode data packets according to applicable physical layer specifications or standards. MAC circuitry 516 can be configured to assemble data to be transmitted into packets, that include destination and source addresses along with network control information and error detection hash values. Processors 504 can be implemented as any or a combination of: a processor, core, microprocessor, graphics processing unit (GPU), field programmable gate array (FPGA), application specific integrated circuit (ASIC), or other programmable hardware device that allow programming of network interface 500. For example, a packet processing circuitry can include any and all implementations of processors 504. For example, processors 504 can perform a determination of whether a received packet can be stored in a buffer selected by network interface 500. For example, a "smart network interface" can provide packet processing capabilities in the network interface using processors 504.

Packet allocator 524 can provide distribution of received packets for processing by multiple CPUs or cores using timeslot allocation described herein or RSS. When packet allocator 524 uses RSS, packet allocator 524 can calculate a hash or make another determination based on contents of a received packet to determine which CPU or core is to process a packet.

Interrupt coalesce 522 can perform interrupt moderation whereby network interface interrupt coalesce 522 waits for multiple packets to arrive, or for a time-out to expire, before generating an interrupt to host system to process received packet(s). Receive Segment Coalescing (RSC) can be performed by network interface 500 whereby portions of incoming packets are combined into segments of a packet. Network interface 500 provides this coalesced packet to an application.

Direct memory access (DMA) engine 552 can copy a packet header, packet payload, and/or descriptor directly from host memory to the network interface or vice versa, instead of copying the packet to an intermediate buffer at the host and then using another copy operation from the intermediate buffer to the destination buffer. In some embodiments, multiple DMA engines are available for transfer of contents of packets to a destination memory associated with a host device or a destination memory associated with an accelerator device.

Memory 510 can be any type of volatile or non-volatile memory device and can store any queue or instructions used to program network interface 500. Transmit queue 506 can include data or references to data for transmission by network interface. Receive queue 508 can include data or references to data that was received by network interface from a network. Descriptor queues 520 can include descriptors that reference data or packets in transmit queue 506 or receive queue 508 and corresponding destination memory regions. Bus interface 512 can provide an interface with host device (not depicted). For example, bus interface 512 can be compatible with PCI, PCI Express, PCI-x, Serial ATA, and/or USB compatible interface (although other interconnection standards may be used).

In some examples, processors 504 can process received packets to determine whether the received packets include durability flags or durability or data synchronization in accordance with embodiments described herein.

In some examples, processors 504 can perform one or more of: large receive offload (LRO), large send/segmentation offload (LSO), TCP segmentation offload (TSO), Transport Layer Security (TLS) offload, receive side scaling (RSS) to allocate a queue or core to process a payload. LRO can refer to reassembling incoming network packets and transfer packet contents (e.g., payloads) into larger contents and transferring the resulting larger contents but fewer packets for access by the host system or a virtual machine.

LSO can refer to generating a multipacket buffer and providing content of the buffer for transmission. A host device can build a larger TCP message (or other transport layer) (e.g., 64 KB in length) and processors 504 can segment the message it into smaller data packets for transmission.

TLS is defined at least in The Transport Layer Security (TLS) Protocol Version 1.3, RFC 8446 (August 2018). TLS offload can refer to offload of encryption or decryption of contents in accordance with TLS in processors 504. Network interface 500 can receive data for encryption and perform the encryption of data prior to transmission of encrypted data in one or more packets. Network interface 500 can receive packets and decrypt content of packets prior to transfer of decrypted data to a host system. In some examples, any type of encryption or decryption be performed such as but not limited to Secure Sockets Layer (SSL).

Figure 6:
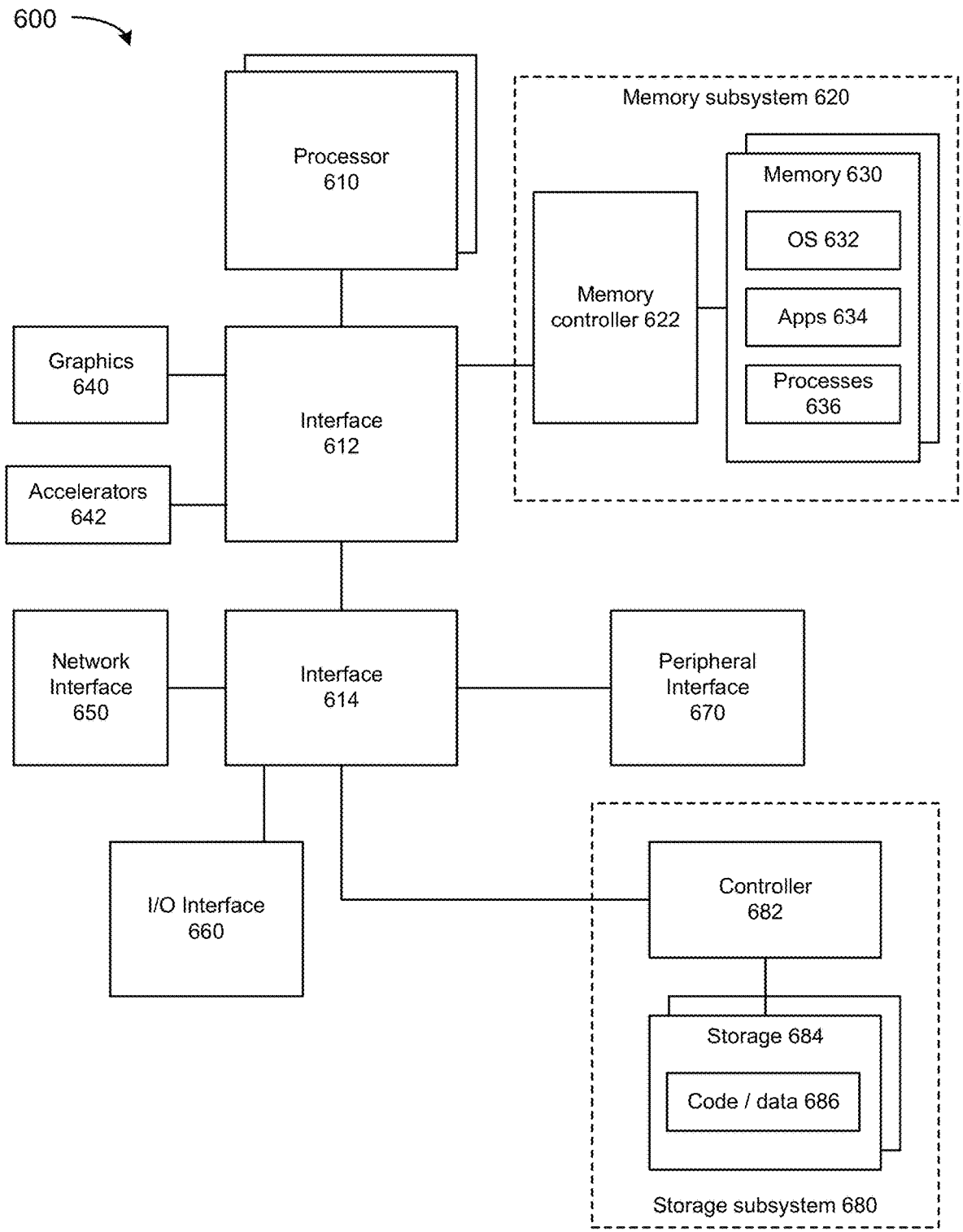
FIG. 6 depicts a system.

FIG. 6 depicts a system. The system can use embodiments described herein in a host, server, rack, or data center in connection with storing data using messages that provide a durability flag and cause durability by a synchronization flag and other embodiments described herein. System 600 includes processor 610, which provides processing, operation management, and execution of instructions for system 600. Processor 610 can include any type of microprocessor, central processing unit (CPU), graphics processing unit (GPU), processing core, or other processing hardware to provide processing for system 600, or a combination of processors. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640, or accelerators 642. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080 p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 can be a programmable or fixed function offload engine that can be accessed or used by a processor 610. For example, an accelerator among accelerators 642 can provide compression (DC) capability, cryptography services such as public key encryption (PKE), cipher, hash/authentication capabilities, decryption, or other capabilities or services. In some embodiments, in addition or alternatively, an accelerator among accelerators 642 provides field select controller capabilities as described herein. In some cases, accelerators 642 can be integrated into a CPU socket (e.g., a connector to a motherboard or circuit board that includes a CPU and provides an electrical interface with the CPU). For example, accelerators 642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 642 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, Gen-Z, CCIX, a universal serial bus (USB), or an Institute of Electrical and Electronics Engineers (IEEE) standard 1394 bus (Firewire).

In one example, system 600 includes interface 614, which can be coupled to interface 612. In one example, interface 614 represents an interface circuit, which can include standalone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a device that is in the same data center or rack or a remote device, which can include sending data stored in memory. Network interface 650 can receive data from a remote device, which can include storing received data into memory. Various embodiments can be used in connection with network interface 650, processor 610, and memory subsystem 620.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data 686 in a persistent state (e.g., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (e.g., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the memory. In some embodiments, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, Micron® 3D XPoint™, Samsung® Z-NAND, battery backed-up volatile memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented using interconnected compute sleds of processors, memories, storages, network interfaces, and other components. High speed interconnects can be used such as PCIe, Ethernet, or optical interconnects (or a combination thereof).

Figure 7:
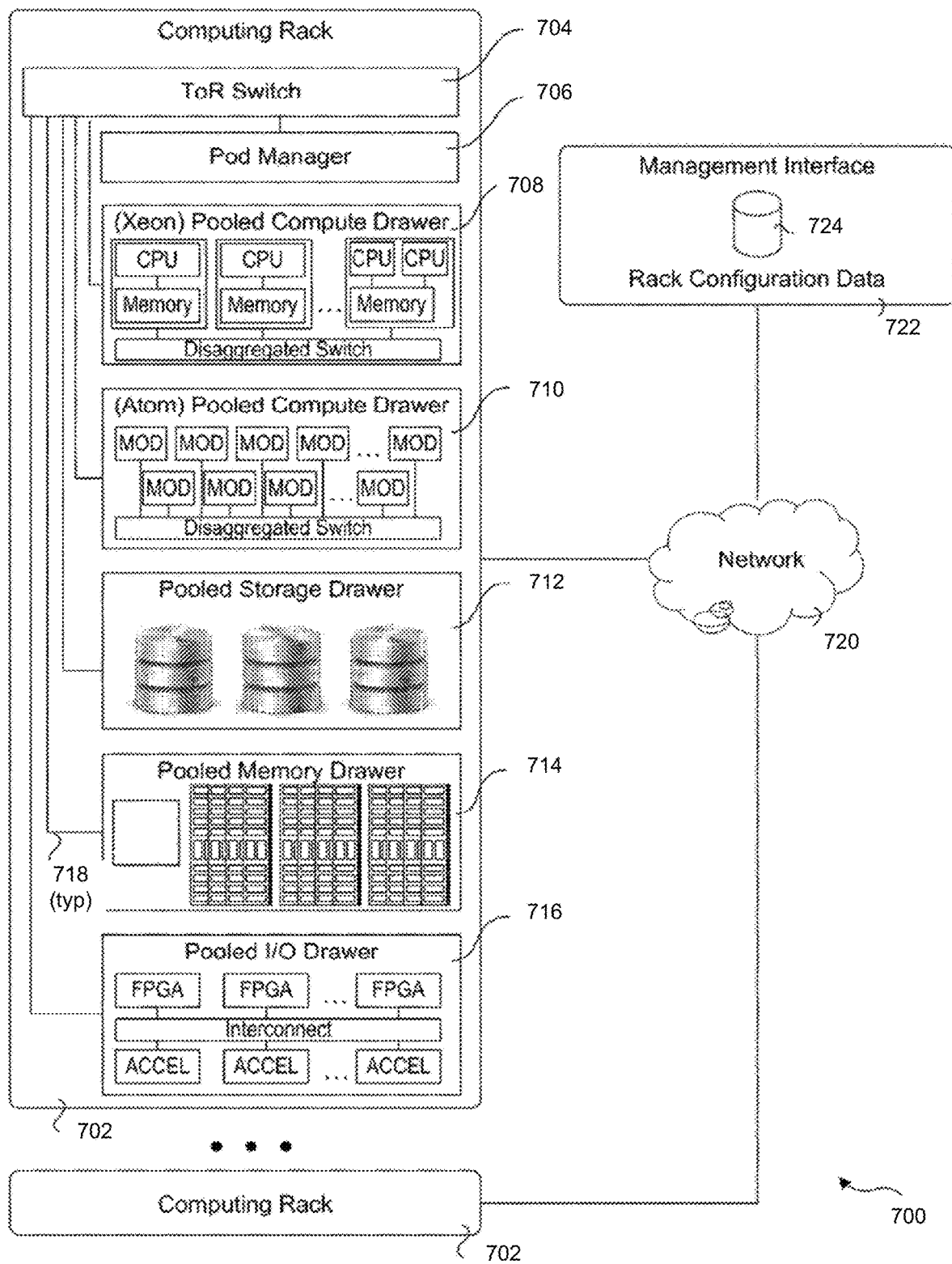
FIG. 7 depicts an example environment.

FIG. 7 depicts an environment 700 includes multiple computing racks 702, each including a Top of Rack (ToR) switch 704, a pod manager 706, and a plurality of pooled system drawers. The environment can use embodiments described herein in a host, server, rack, or data center in connection with storing data using messages that provide a durability flag and cause durability by a synchronization flag and other embodiments described herein. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 708, and Intel® ATOM™ pooled compute drawer 710, a pooled storage drawer 712, a pooled memory drawer 714, and a pooled I/O drawer 716. Each of the pooled system drawers is connected to ToR switch 704 via a high-speed link 718, such as a 40 Gigabit/second (Gb/s) or 100 Gb/s Ethernet link or a 100+ Gb/s Silicon Photonics (SiPh) optical link. In some embodiments, high-speed link 718 comprises an 800 Gb/s SiPh optical link.

Multiple of the computing racks 702 may be interconnected via their ToR switches 704 (e.g., to a pod-level switch or data center switch), as illustrated by connections to a network 720. In some embodiments, groups of computing racks 702 are managed as separate pods via pod manager(s) 706. In some embodiments, a single pod manager is used to manage all of the racks in the pod. Alternatively, distributed pod managers may be used for pod management operations.

Environment 700 further includes a management interface 722 that is used to manage various aspects of the environment. This includes managing rack configuration, with corresponding parameters stored as rack configuration data 724. Environment 700 can be used for computing racks.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In some embodiments, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

Some examples include a system comprising: at least one processor; a memory; and a transmit controller to: form a request a write operation to write data directly to volatile memory, the request including a flag that indicates to write the data to both volatile and persistent memory and transmit the request to a remote device; and a receiver controller in the remote device, the receiver controller to: receive the request and cause the data to be written to volatile memory and to a backed-up region of memory based on the flag that indicates to write the data to both volatile and persistent memory.

In some examples, the volatile memory comprises a cache and/or random access memory device and the persistent memory comprises one or more of: a volatile memory with power supply, non-volatile memory, persistent memory.

In some examples, wherein the receiver controller is to receive a request from the transmit controller to persist data including a durability point and the receiver controller is to cause data written to a memory buffer to be written to persistent memory.

In some examples, wherein the receiver controller is to transmit a response to the request to persist data including a durability point with an indication that data persistence occurred.

In some examples, wherein volatile memory is part of an Asynchronous DRAM Refresh domain and is to be persisted in an event of a power loss.

Example 1 includes a network interface apparatus comprising: packet processing circuitry and a bus interface, the packet processing circuitry to: process a received packet that includes data, a request to perform a write operation to write the data to a cache, and an indicator that the data is to be durable and based at least on the received packet including the request and the indicator, cause the data to be written to the cache and non-volatile memory.

Example 2 includes any example, wherein to cause the data to be written to the cache and the non-volatile memory, the packet processing circuitry is to issue a command to an input output (IO) controller to cause the IO controller to write the data to the cache and the non-volatile memory.

Example 3 includes any example, wherein: the cache comprises one or more of: a level-0 (L0), level-1 (L1), level-2 (L2), or last level cache (LLC) and the non-volatile memory comprises one or more of: volatile memory that is part of an Asynchronous DRAM Refresh (ADR) domain, persistent memory, battery-backed memory, or memory device whose state is determinate even if power is interrupted to the memory device.

Example 4 includes any example, wherein: based on receipt of a second received packet that includes a request to persist data, the packet processing circuitry is to request that data stored in a memory buffer be copied to the non-volatile memory.

Example 5 includes any example, wherein to request that data stored in a memory buffer be copied to the non-volatile memory, the packet processing circuitry is to issue a command to an input output (IO) controller to cause the IO controller to copy the data in the memory buffer into the non-volatile memory.

Example 6 includes any example, wherein: based on receipt of a second received packet that includes a request to persist data, the packet processing circuitry is to cause a region of a memory buffer that stores the data, in an event of power loss to the memory buffer, to be copied to a memory device whose state is determinate even if power is interrupted to the memory device.

Example 7 includes any example, wherein the packet processing circuitry is to: cause transmission of a response to the request to persist data indicating the data has been persisted regardless of whether the data has been stored in the non-volatile memory.

Example 8 includes any example, wherein the received packet comprises one or more of: an Ethernet packet, an InfiniB and packet, a remote direct memory access (RDMA) request, or a Data Direct I/O (DDIO) request.

Example 9 includes any example, and including one or more of: a host, server, rack, or data center, wherein one or more of the host, server, rack, or data center are to process the data from the cache.

Example 10 includes any example, and including a network interface apparatus comprising: a bus connection and circuitry, the circuitry to: form a packet with a request to perform a write operation, the write operation to cause data to be written directly to a receiver cache and the request including a flag that requests a receiver device to write the data both to the receiver cache and persist the data and cause transmission of the packet to the receiver device.

Example 11 includes any example, wherein the circuitry is to: form a second packet with a request to persist the data written to a memory buffer to a memory device whose state is determinate even if power is interrupted to the memory device and cause transmission of the second packet to the receiver device.

Example 12 includes any example, wherein the circuitry is to: process a response from the receiver device indicating that the data was stored to the memory device whose state is determinate even if power is interrupted to the memory device.

Example 13 includes any example, wherein the circuitry is to: form a second packet with a request to persist the data written to a memory buffer, wherein the request to persist the data is to cause identification of a region of the memory buffer as part of an Asynchronous DRAM Refresh (ADR) domain and cause transmission of the second packet to the receiver device.

Example 14 includes any example, wherein the packet comprises one or more of: an Ethernet packet, an InfiniB and packet, a remote direct memory access (RDMA) request, or a Data Direct I/O (DDIO) request.

Example 15 includes any example, and including one or more of: a host, server, rack, or data center, wherein one or more of the host, server, rack, or data center are to execute a database application that is to cause the form a packet with a request to perform a write operation.

Example 16 includes any example, and including a method comprising: processing a received packet, wherein the received packet includes data, a request to perform a write operation to write data to a cache, and an indicator to make the data durable and based at least on the received packet including the request and the indicator, requesting the data to be written to the cache and a non-volatile memory.

Example 17 includes any example, wherein: the cache comprises one or more of: a level-0 (L0), level-1 (L1), level-2 (L2), or last level cache (LLC) and the non-volatile memory comprises one or more of: volatile memory that is part of an Asynchronous DRAM Refresh (ADR) domain, persistent memory, battery-backed memory, or memory device whose state is determinate even if power is interrupted to the memory device.

Example 18 includes any example, and including based on receipt of a second received packet that includes a request to persist data, requesting that the data stored in a memory buffer be copied to the non-volatile memory.

Example 19 includes any example, and including based on receipt of a second received packet that includes a request to persist data, causing a region of a memory buffer that stores the data to be part of a region of the memory buffer as part of an Asynchronous DRAM Refresh (ADR) domain.

Example 20 includes any example, and including: causing transmission of a response to the indicator to make the data durable indicating the data has been persisted regardless of whether the data has been stored in the non-volatile memory.

What is claimed is:

1. A network interface apparatus comprising:
    packet processing circuitry and a bus interface, the packet processing circuitry to:
        process a received packet that includes data, a request to perform a write operation to write the data to a cache, and an indicator that the data is to be durable and
        based at least on the received packet including the request and the indicator, cause the data to be written to the cache and non-volatile memory.

2. The apparatus of claim 1, wherein to cause the data to be written to the cache and the non-volatile memory, the packet processing circuitry is to issue a command to an input output (TO) controller to cause the IO controller to write the data to the cache and the non-volatile memory.

3. The apparatus of claim 1, wherein:
the cache comprises one or more of: a level-0 (L0), level-1 (L1), level-2 (L2), or last level cache (LLC) and
the non-volatile memory comprises one or more of: volatile memory that is part of an Asynchronous DRAM Refresh (ADR) domain, persistent memory, battery-backed memory, or memory device whose state is determinate even if power is interrupted to the memory device.

4. The apparatus of claim 1, wherein:
based on receipt of a second received packet that includes a request to persist data, the packet processing circuitry is to request that data stored in a memory buffer be copied to the non-volatile memory.

5. The apparatus of claim 4, wherein to request that data stored in the memory buffer be copied to the non-volatile memory, the packet processing circuitry is to issue a command to an input output (IO) controller to cause the IO controller to copy the data in the memory buffer into the non-volatile memory.

6. The apparatus of claim 1, wherein:
based on receipt of a second received packet that includes a request to persist data, the packet processing circuitry is to cause a region of a memory buffer that stores the data, in an event of power loss to the memory buffer, to be copied to a memory device whose state is determinate even if power is interrupted to the memory device.

7. The apparatus of claim 4, wherein the packet processing circuitry is to:
cause transmission of a response to the request to persist data indicating the data has been persisted regardless of whether the data has been stored in the non-volatile memory.

8. The apparatus of claim 1, wherein the received packet comprises one or more of: an Ethernet packet, an InfiniBand packet, a remote direct memory access (RDMA) request, or a Data Direct I/O (DDIO) request.

9. The apparatus of claim 1, comprising one or more of: a host, server, rack, or data center, wherein one or more of the host, server, rack, or data center comprising circuitry to process the data from the cache.

10. A network interface apparatus comprising:
a bus connection and circuitry, wherein the circuitry is to:
form a packet with a command, wherein performance the command to cause a receiver device to copy data directly to a cache and the command includes a flag to cause the receiver device to copy the data also to non-volatile memory and
cause transmission of the packet to the receiver device.

11. The apparatus of claim 10, wherein the circuitry is to:
form a second packet with a request to persist the data written to a memory buffer to a memory device whose state is determinate even if power is interrupted to the memory device and
cause transmission of the second packet to the receiver device.

12. The apparatus of claim 11, wherein the circuitry is to:
process a response from the receiver device indicating that the data was stored to the memory device whose state is determinate even if power is interrupted to the memory device.

13. The apparatus of claim 10, wherein the circuitry is to:
form a second packet with a request to persist the data written to a memory buffer, wherein the request to persist the data is to cause identification of a region of the memory buffer as part of an Asynchronous DRAM Refresh (ADR) domain and
cause transmission of the second packet to the receiver device.

14. The apparatus of claim 10, wherein the packet comprises one or more of: an Ethernet packet, an InfiniB and packet, a remote direct memory access (RDMA) request, or a Data Direct I/O (DDIO) request.

15. The apparatus of claim 10, comprising one or more of: a host, server, rack, or data center, wherein one or more of the host, server, rack, or data center are to execute an application that is to cause the form the packet with the command.

16. A method comprising:
a network interface performing:
processing a received packet, wherein the received packet includes: data, a request to perform a write operation to write the data to a cache, and an indicator to make the data durable and
causing the data to be written to the cache and a non-volatile memory.

17. The method of claim 16, wherein:
the cache comprises one or more of: a level-0 (L0), level-1 (L1), level-2 (L2), or last level cache (LLC) and
the non-volatile memory comprises one or more of: volatile memory that is part of an Asynchronous DRAM Refresh (ADR) domain, persistent memory, battery-backed memory, or memory device whose state is determinate even if power is interrupted to the memory device.

18. The method of claim 16, comprising:
the network interface performing:
based on receipt of a second received packet that includes a request to persist data, requesting that the data stored in a memory buffer be copied to the non-volatile memory.

19. The method of claim 16, comprising:
the network interface performing:
based on receipt of a second received packet that includes a request to persist data, causing a region of a memory buffer that stores the data to be part of a region of the memory buffer as part of an Asynchronous DRAM Refresh (ADR) domain.

20. The method of claim 16, comprising:
the network interface performing:
causing transmission of a response to the indicator to make the data durable indicating the data has been persisted regardless of whether the data has been stored in the non-volatile memory.

21. The method of claim 16, comprising:
the network interface performing:
causing transmission of a response to the indicator to make the data durable indicating the data has been persisted despite the data not having been stored to the non-volatile memory.

22. The apparatus of claim 1, wherein indicator that the data is to be durable comprises an indicator to cause copying of the data into non-volatile memory and/or battery-backed volatile memory.

23. The method of claim 16, wherein the indicator to make the data durable comprises an indicator to cause copying of the data into non-volatile memory and/or battery-backed volatile memory.

* * * * *

UNITED STATES PATENT AND TRADEMARK OFFICE
CERTIFICATE OF CORRECTION

PATENT NO. : 11,709,774 B2
APPLICATION NO. : 16/986094
DATED : July 25, 2023
INVENTOR(S) : Ren Wang et al.

It is certified that error appears in the above-identified patent and that said Letters Patent is hereby corrected as shown below:

In the Claims

Column 22, Line 63 Claim 2 change:
"the packet processing circuitry is to issue a command to an input output (TO) controller to cause the IO controller to write the data to the cache and the non-volatile memory."

To:
the packet processing circuitry is to issue a command to an input output (IO) controller to cause the IO controller to write the data to the cache and the non-volatile memory.

Signed and Sealed this
Twenty-first Day of November, 2023

Katherine Kelly Vidal
*Director of the United States Patent and Trademark Office*